United States Patent
Wu

(10) Patent No.: US 9,162,616 B2
(45) Date of Patent: Oct. 20, 2015

(54) LUMINOUS RADIATOR COVER DEVICE FOR A VEHICLE

(71) Applicant: Coplus Inc., Tainan (TW)

(72) Inventor: Jacob Wu, Tainan (TW)

(73) Assignee: Coplus Inc., Tainan (TW)

( * ) Notice: Subject to any disclaimer, the term of this patent is extended or adjusted under 35 U.S.C. 154(b) by 546 days.

(21) Appl. No.: 13/623,830

(22) Filed: Sep. 20, 2012

(65) Prior Publication Data

US 2013/0293104 A1 Nov. 7, 2013

(30) Foreign Application Priority Data

May 1, 2012 (TW) .............................. 101115465 A

(51) Int. Cl.
*B60Q 1/28* (2006.01)
*B60Q 1/38* (2006.01)
*B60Q 1/50* (2006.01)
*B60Q 1/26* (2006.01)
*B60R 19/52* (2006.01)

(52) U.S. Cl.
CPC ................ *B60Q 1/38* (2013.01); *B60Q 1/2661* (2013.01); *B60Q 1/50* (2013.01); *B60R 19/52* (2013.01); *B60R 2019/525* (2013.01)

(58) Field of Classification Search
USPC .......................... 362/502, 509, 510, 543, 545
See application file for complete search history.

(56) References Cited

U.S. PATENT DOCUMENTS

| 6,335,681 B1* | 1/2002 | Ontiveros et al. | 340/466 |
| 2005/0036327 A1* | 2/2005 | Patel | 362/487 |
| 2007/0206389 A1* | 9/2007 | Salazar | 362/540 |
| 2008/0043484 A1* | 2/2008 | Lin | 362/511 |

FOREIGN PATENT DOCUMENTS

| TW | M264142 | 5/2005 |
| TW | M277661 | 10/2005 |

* cited by examiner

*Primary Examiner* — Douglas W Owens
*Assistant Examiner* — James H Cho
(74) *Attorney, Agent, or Firm* — Christie, Parker & Hale, LLP

(57) ABSTRACT

A luminous radiator cover device includes: a lighting cover unit (2) including a looped frame (3) mounted to a front side of a vehicle (900), multiple hollow light-transmissive ribs (4) each disposed in and connected to the frame (3), and multiple lighting units (5) each disposed in a corresponding light-transmissive rib (4); and a control unit (6) connected electrically to the lighting units (5) of the lighting cover unit (2). The control unit (6) is operable to control the lighting units (5) of the lighting cover unit (2) to operate in a lighting mode, where lighting of each lighting unit (5) is varied in response to sound in the vehicle (900).

11 Claims, 10 Drawing Sheets

LUMINOUS RADIATOR COVER DEVICE FOR A VEHICLE

CROSS-REFERENCE TO RELATED APPLICATION

This application claims priority to and the benefit of Taiwanese Patent Application Number 101115465, filed on May 1, 2012, the entire disclosure of which is incorporated herein by reference.

FIELD

The invention relates to a vehicle radiator cover, and more particularly to a luminous radiator cover device for a vehicle.

BACKGROUND

Generally, a vehicle is provided with a radiator cover at the front thereof. Such radiator cover includes a looped frame, and a plurality of ribs connected to and disposed in the looped frame. A space is formed between any adjacent two ribs to permit air to flow into a vehicle engine room therethrough, thereby dissipating heat.

Currently, the industry has developed a variety of lighting cover structures for a vehicle radiator, for example, a conventional illuminating vehicle radiator cover disclosed in Taiwanese Utility Model No. M277661, and a conventional LED (light-emitting diode) lighting structure disclosed in Taiwanese Utility Model No. M264142. In the conventional illuminating vehicle radiator cover, a light-emit ting optical fiber cord is embedded in a cover frame along a periphery thereof. Since light emitted by the optical fiber cord merely radiates from a looped area around the periphery of the cover frame, the conventional illuminating vehicle radiator cover has an inferior lighting effect. As to the conventional LED lighting structure, which has LEDs installed in a cover frame, since light emitting by the LEDs is concentrated to radiate frontward, the light coming out of the conventional LED lighting structure may dazzle a driver in an oncoming car and adversely affect driving safety. Furthermore, the lighting effects produced by the conventional illuminating vehicle radiator cover and the conventional LED lighting structure lack variation. Therefore, there is still room for improvements.

Therefore, an object of the present invention is to provide a luminous radiator cover device for a vehicle that can overcome the aforesaid drawbacks of the prior art. According to the present invention, there is provided a luminous radiator cover device for a vehicle. The luminous radiator cover device of this invention comprises at least one lighting cover unit, and a control unit.

SUMMARY

The lighting cover unit includes a looped frame, a plurality of hollow light-transmissive ribs, and a plurality of lighting units. The looped frame is adapted to be mounted to a front side of the vehicle. The light-transmissive ribs are disposed spacedly in and connected to the looped frame. The light-transmissive ribs are arranged in a first direction. Each of the light-transmissive ribs extends in a second direction transverse to the first direction, and is configured with an inner receiving space that extends in the second direction. Each of the lighting units is disposed in the inner receiving space of a corresponding one of the light-transmissive ribs, and is capable of emitting light.

The control unit is connected electrically to the lighting units of the lighting cover unit. The control unit is operable to control the lighting units of the lighting cover unit to operate in a lighting mode, where lighting of each of the lighting units is varied in response to at least sound in the vehicle.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION

Figure 1:
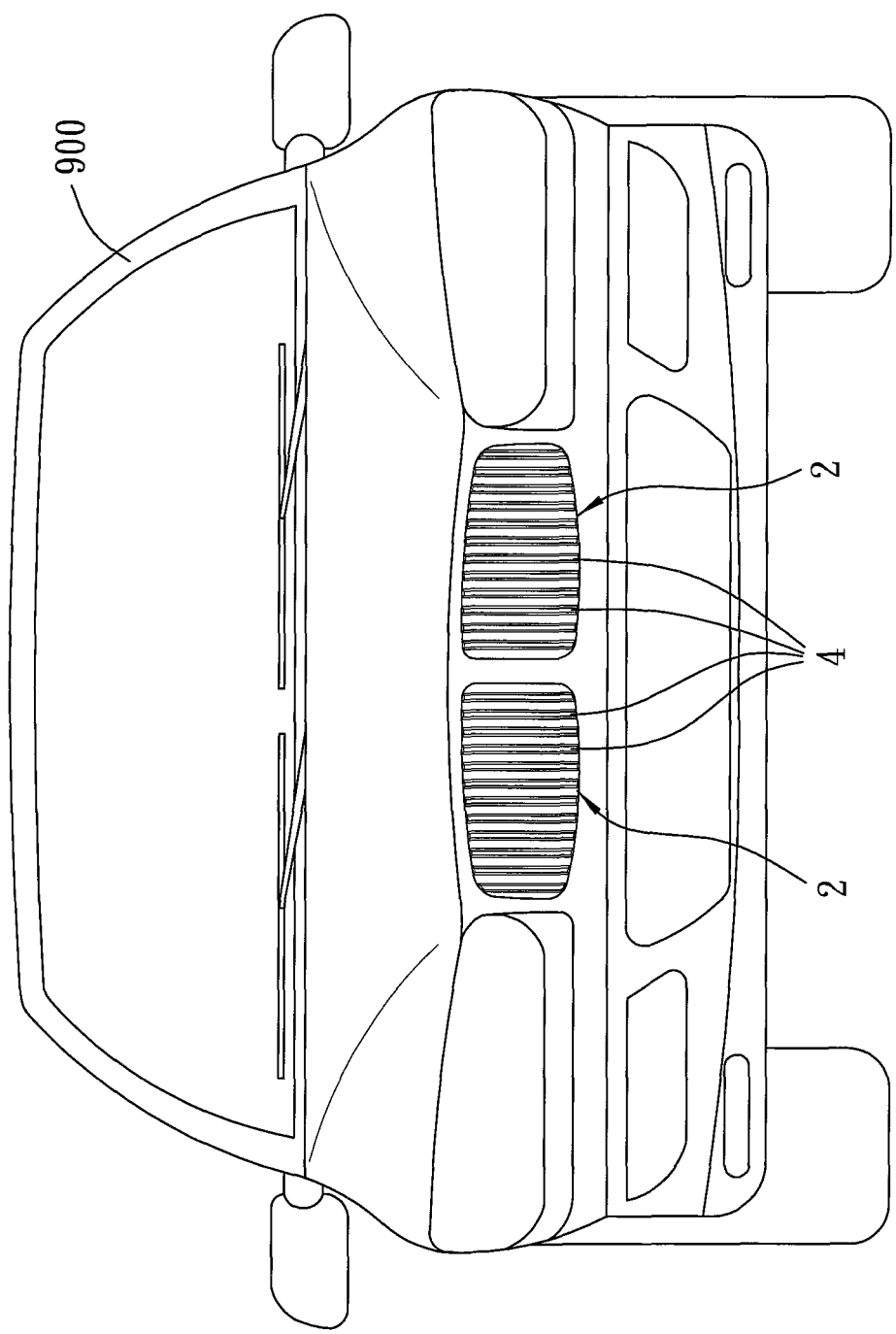
FIG. 1 is a schematic front view showing the first preferred embodiment of a luminous radiator cover device for a vehicle according to the present invention when mounted to the vehicle.
Figure 4:
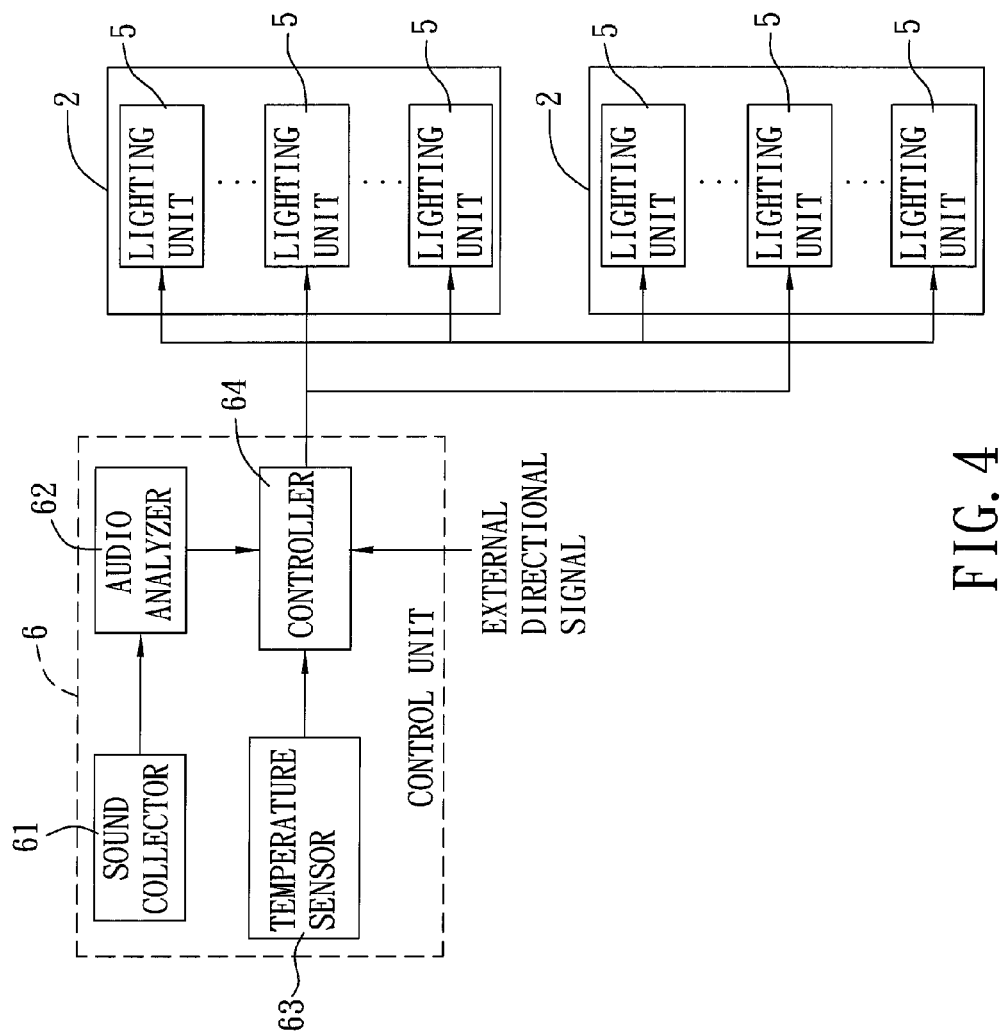
FIG. 4 is a schematic circuit block diagram illustrating electronic components of the first preferred embodiment.

Referring to FIGS. 1 and 4, the first preferred embodiment of a luminous radiator cover device for a vehicle 900 according to the present invention is shown to include two lighting cover units 2, and a control unit 6.

Figure 2:
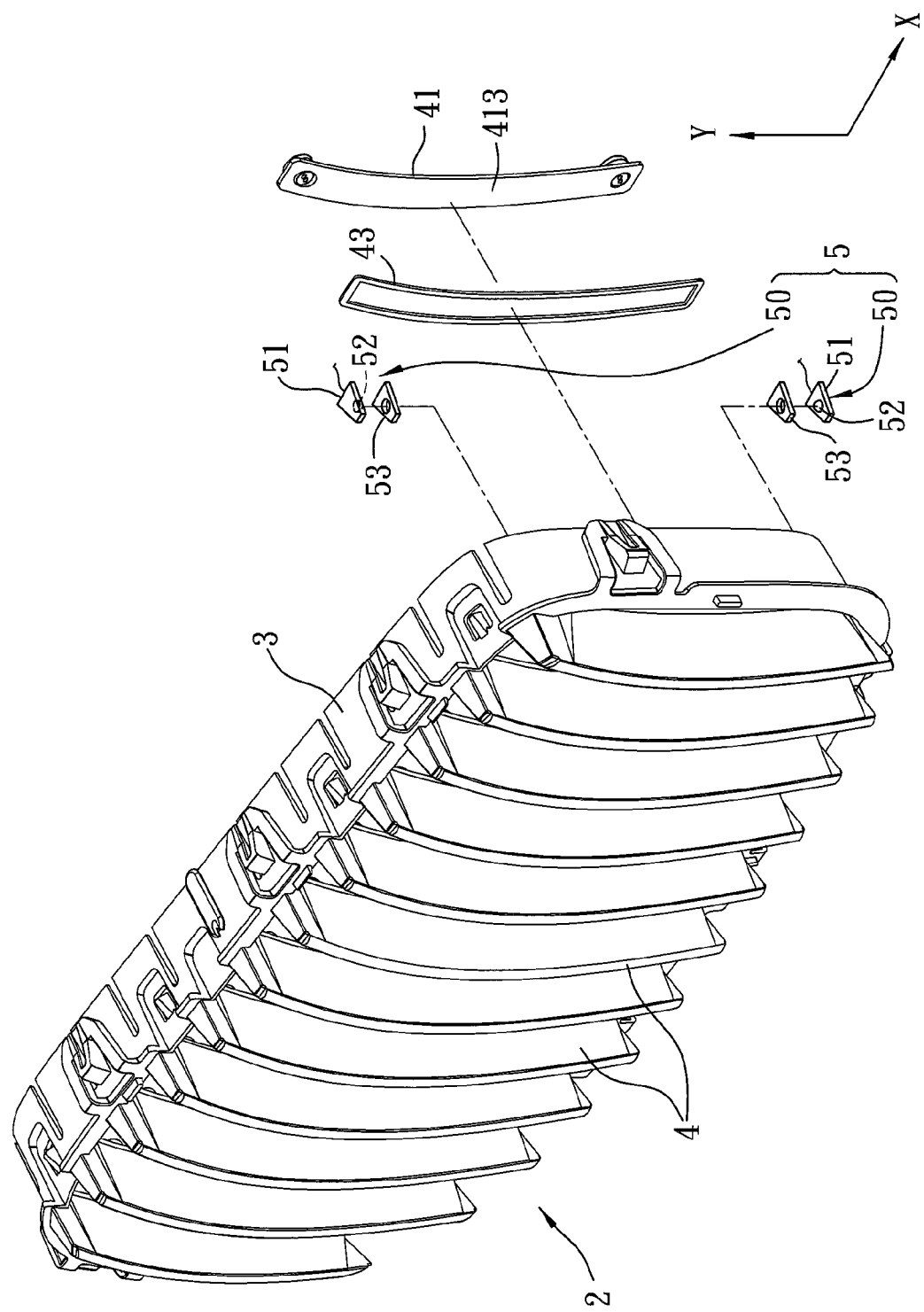
FIG. 2 is a partly exploded perspective view showing a lighting cover unit of the first preferred embodiment.
Figure 3:
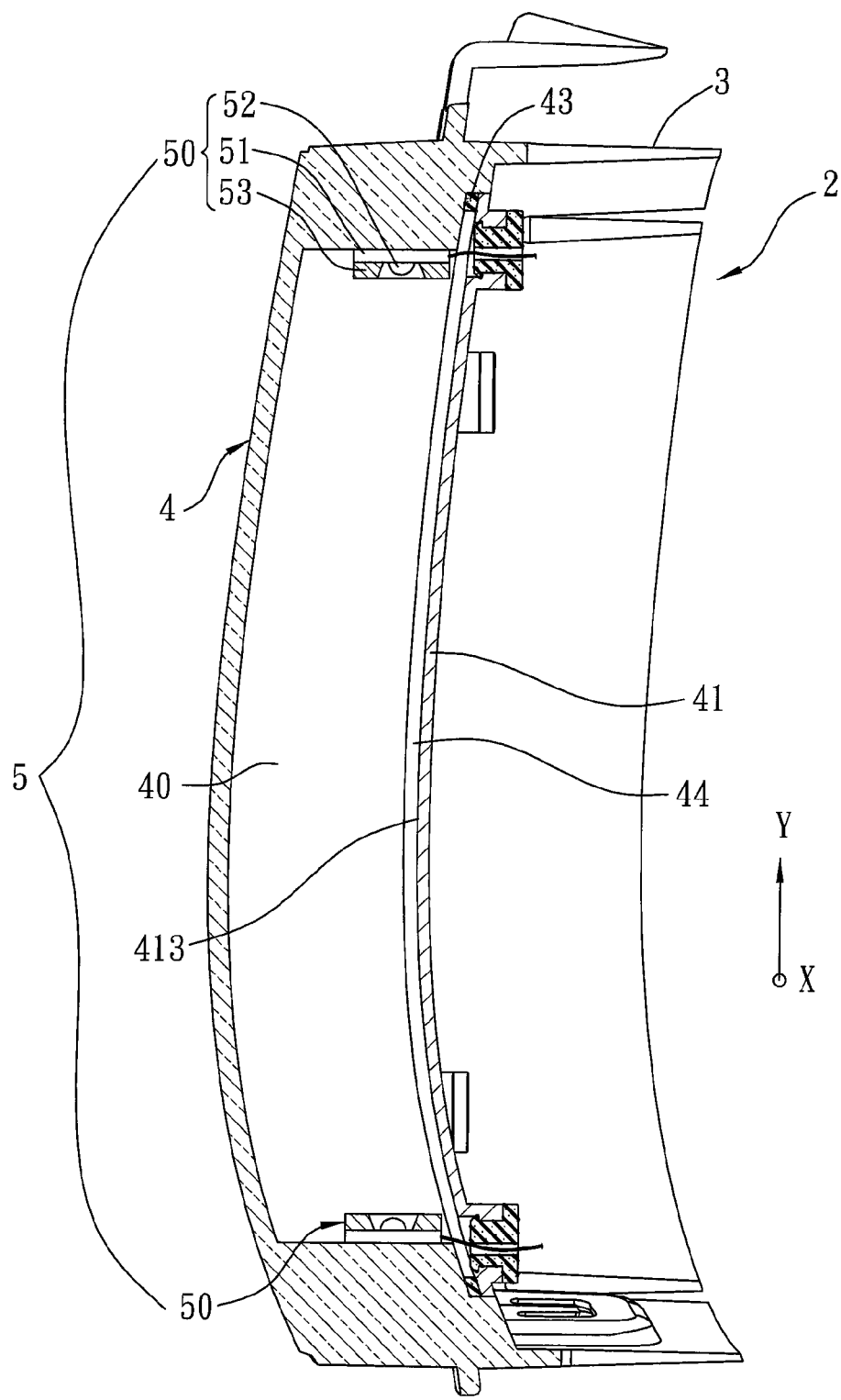
FIG. 3 is a schematic sectional view showing the lighting cover unit of the first preferred embodiment.

The lighting cover units 2 are adapted to be mounted spacedly to a front side of the vehicle 900 for covering a radiator (not shown) in the vehicle 900. Referring further to FIGS. 2 and 3, each lighting cover unit 2 includes a looped frame 3, a plurality of hollow light-transmissive ribs 4, a plurality of lighting units 5, and a plurality of cover plates 41. The following are details of each lighting cover unit 2.

The looped frame 3 is adapted to be mounted to the front side of the vehicle 900. In this embodiment, the looped frame 3 is generally rectangular in shape. In other embodiments, the looped frame 3 can be designed to have a shape matching the exterior of the vehicle 900.

The light-transmissive ribs 4 are disposed spacedly in and are connected integrally to the looped frame 3. The light-transmissive ribs 4 are arranged in a first direction (X). Each light-transmissive rib 4 extends in a second direction (Y) perpendicular to the first direction (X). In this embodiment, the first direction (X) is a horizontal direction, and the second direction (Y) is a vertical direction. Each light-transmissive rib 4 is configured with an inner receiving space 40 that extends in the second direction (Y), and has a rear opening 44 in spatial communication with the inner receiving space 40. In this embodiment, the inner receiving space 40 of each light-transmissive rib 4 has a width gradually increasing toward the rear opening 44, but is not limited thereto.

Each lighting unit 5 is disposed in the inner receiving space 40 in a corresponding light-transmissive rib 4, and includes two lighting modules 50 spaced apart from each other in the second direction (Y). Each lighting module 50 of each lighting unit 5 includes a light-mounting seat 51 secured to the corresponding light-transmissive rib 4, a light-emitting element 52 mounted on the light-mounting seat 51, and a light-guiding seat 53 attached to the light-mounting seat 51 and disposed around the light-emitting element 52 for guiding light emitted by the light-emitting element 52 toward the other lighting module 50 of the lighting unit 5. In this embodiment, the light-emitting element 52 is a light-emitting diode (LED), which is capable of being activated to emit light with various colors, such as blue, green, red, etc.

Each cover plate 41 is mounted to a corresponding light-transmissive rib 4 for covering the rear opening 44 in the corresponding light-transmissive rib 4, and has a front reflecting surface 413 for reflecting light from the lighting modules 50 disposed in the corresponding light-transmissive rib 4 toward a front side of the corresponding light-transmissive rib 4. In addition, a waterproof o-ring 43 is disposed sealingly between each cover plate 41 and the corresponding light-transmissive rib 4.

As shown in FIG. 4, the control unit 6 is connected electrically to the lighting units 5 of each lighting cover unit 2. The control unit 6 is operable to control the lighting units 5 of the lighting cover units 2 to operate in one of a first lighting mode and a second lighting mode. The control unit 6 includes a sound collector 61, an audio analyzer 62, a temperature sensor 63, and a controller 64.

The sound collector 61 is adapted to be disposed in the vehicle 900 for collecting sound in the vehicle 900 to output an audio signal corresponding to the collected sound. The sound to be collected by the sound collector 61 includes human voice or sounds produced by a vehicle audio system (not shown).

The audio analyzer 62 is connected electrically to the sound collector 61. The audio analyzer 62 receives the audio signal from the sound collector 61, analyzes the audio signal to obtain frequency variation and intensity variation of the audio signal, and outputs a frequency analysis signal corresponding to the frequency variation of the audio signal and an intensity analysis signal corresponding to the intensity variation of the audio signal.

The temperature sensor 63 is adapted to be disposed in the vehicle 900 for sensing ambient temperature near the temperature sensor 63 to output a temperature signal corresponding to the ambient temperature.

The controller 64 is connected electrically to the audio analyzer 62, the temperature sensor 63, and the lighting units 50 of the lighting cover units 2. The controller 64 receives the frequency analysis signal and the intensity analysis signal from the audio analyzer 62, and the temperature signal from the temperature sensor 63. Normally, the controller 64 controls the lighting units 5 of the lighting cover units 2 based on the frequency analysis signal, the intensity analysis signal and the temperature signal to operate in the first lighting mode such that the light emitted by each lighting unit 5 of each lighting cover unit 2 has a flash frequency varying with the frequency variation of the audio signal, a brightness varying with the intensity variation of the audio signal, and a color varying with variations in the ambient temperature. For example, when the frequency of the audio signal becomes higher, the flash frequency of each lighting unit 5 is increased accordingly. When the intensity of the audio signal becomes greater, the brightness of each lighting unit 5 is increased accordingly. When the ambient temperature changes from a low temperature to a high temperature, the color of the light emitted by each lighting unit 5 varies from blue to red accordingly. Therefore, when the lighting units 5 of the lighting cover units 2 operate in the first lighting mode, the light emitted thereby has a varying flash frequency, a varying brightness and a varying color, thereby achieving diversified lighting effects.

In addition, when the external directional controller 64 signal for receives an controlling directional indicators or for indicating change in a traveling direction of the vehicle 900, the controller 64 controls the lighting units 5 of the lighting cover units 2 to switch to the second lighting mode, where lighting of each lighting unit 5 is varied to correspond to the operation of the directional indicators of the vehicle 900 or in response to the change in the travelling direction of the vehicle 900. For example, if the directional signal generated by a turn signal switch (not shown) is a right directional signal, each lighting unit 5 of a right one of the lighting cover units 2 is controlled by the controller 64 to flash at a flash frequency, and each lighting unit 5 of a left one of the lighting cover units 2 is controlled by the controller 64 to continuously emit light or cease light emission. Therefore, when the lighting units 5 of the lighting cover units 2 operate in the second lighting mode, direction indication for the vehicle 900 is achieved.

Figure 5:
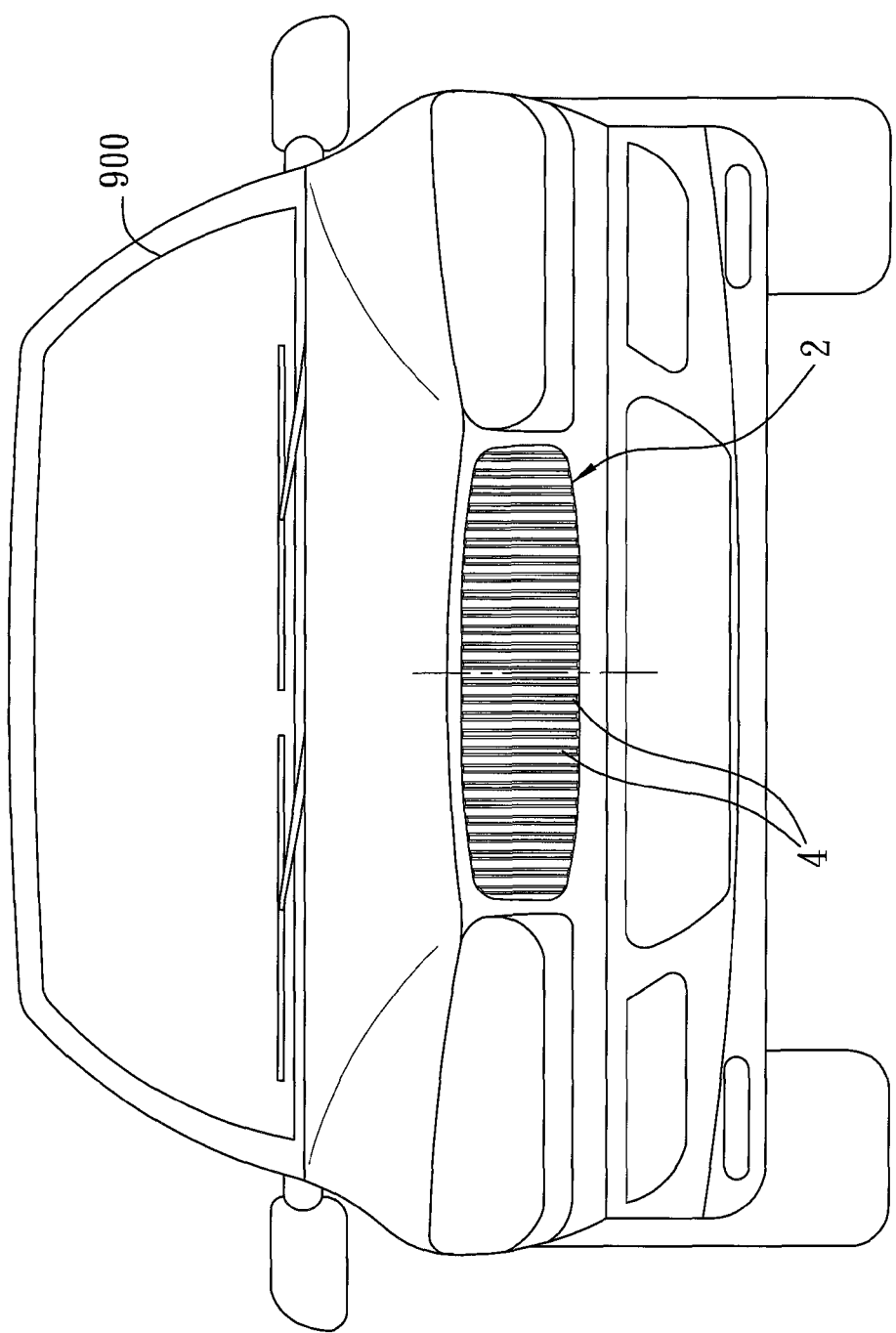
FIG. 5 is a schematic front view showing a variation of the first preferred embodiment when mounted to a vehicle.

FIG. 5 illustrates a variation of the first preferred embodiment of the luminous radiator cover device, wherein only a single lighting cover unit 2 is embodied. In this case, the lighting units 5 (as shown in FIGS. 2 and 4) are grouped into a right group of the lighting units 5 and a left group of the lighting units 5. As a result, when the lighting units 5 operate in the second lighting mode, each lighting unit 5 of one of the right and left groups is controlled by the controller 64 to flash, and each lighting unit 5 of the other one of the right and left groups is controlled by the controller 64 to continuously emit light or cease light emission in accordance with the external directional signal received by the controller 64.

Figure 6:
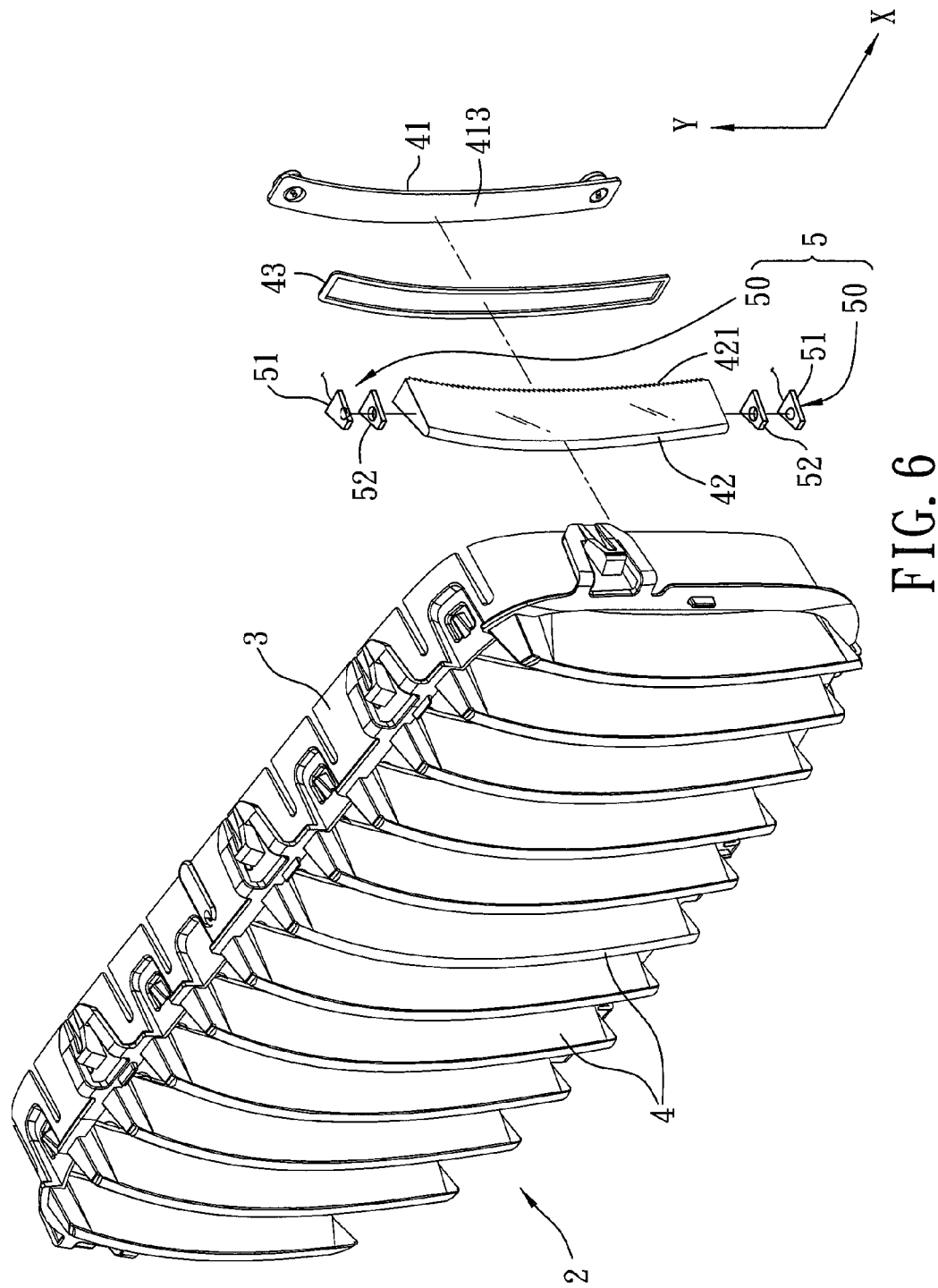
FIG. 6 is a partly exploded perspective view showing a lighting cover unit of the second preferred embodiment of a luminous radiator cover device for a vehicle according to the present invention.
Figure 7:
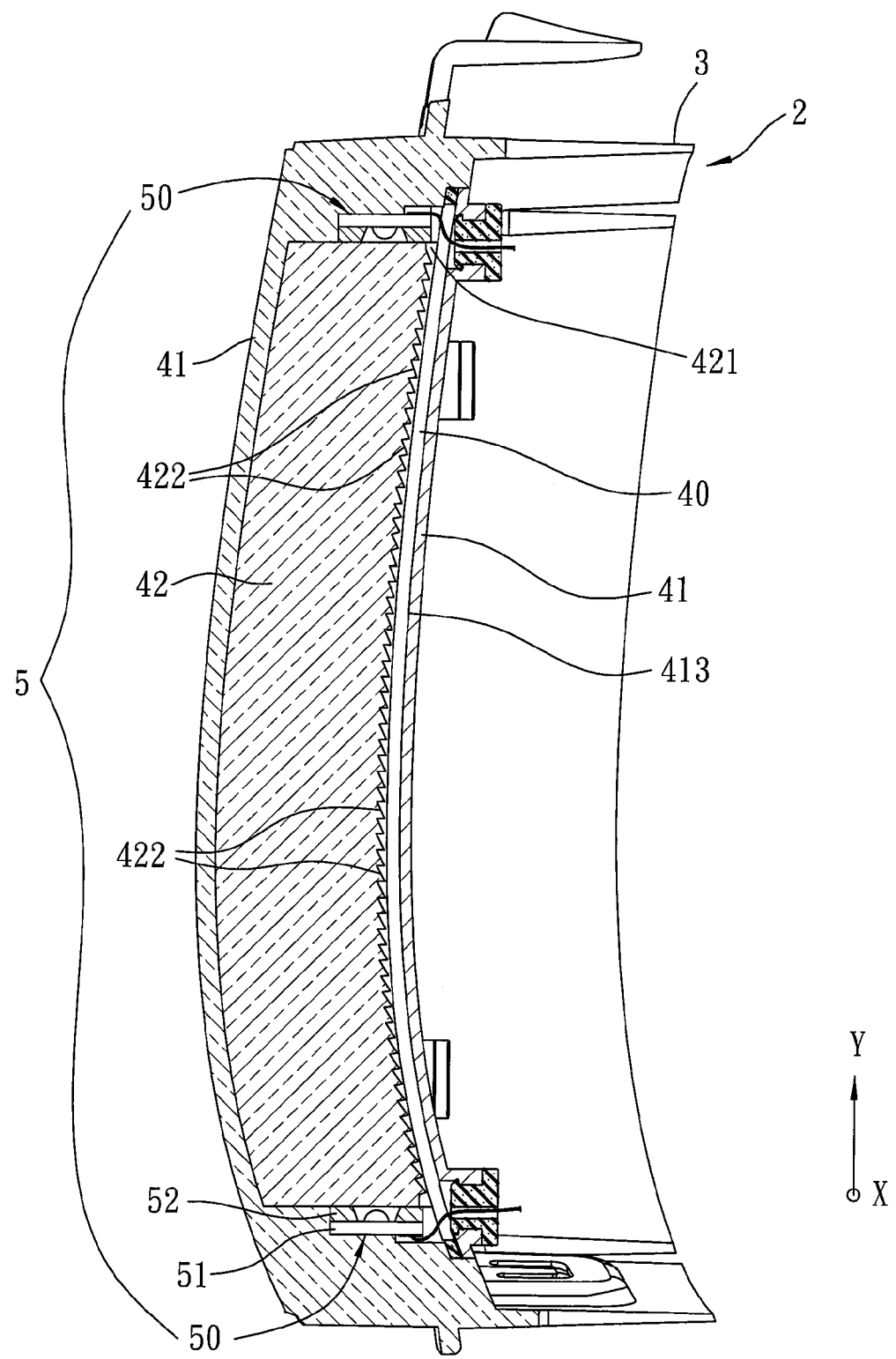
FIG. 7 is a schematic sectional view showing the lighting cover unit of the second preferred embodiment.

FIGS. 6 and 7 illustrate the second preferred embodiment of a luminous radiator cover device for a vehicle 900 (as shown in FIG. 1) according to this invention, which is a modification of the first preferred embodiment.

In this embodiment, each lighting cover unit 2 further includes a plurality of light diffusion ribs 42. Each light diffusion rib 42 is mounted fittingly in the inner receiving space 40 of a corresponding light-transmissive rib 4, and is disposed between the lighting modules 50 in the corresponding light-transmissive rib 4 for diffusing the light emitted by the lighting modules 50. The light diffusion ribs 42 are made of glass material or light-transmissive plastic material with high refractive index. Each light diffusion rib 42 has a rear side 421 that faces the front reflecting surface 413 of the cover plate 41 mounted to the corresponding light-transmissive rib 4 and that is formed with a plurality of spaced apart protrusions 422, which extend in the first direction (X) and are arranged in the second direction (Y) for scattering the light emitted by the lighting modules 50 in the corresponding light-transmissive rib 4 and/or reflected by the front reflecting surface 413 of the cover plate 41 mounted to the corresponding light-transmissive rib 4.

Due to the presence of the light diffusion ribs 42, uniform light distribution in each light-transmissive rib 4 can be achieved. Therefore, radiation of gentle light by each lighting cover unit 2 is made possible, thereby effectively avoiding generation of dazzling light.

Figure 8:
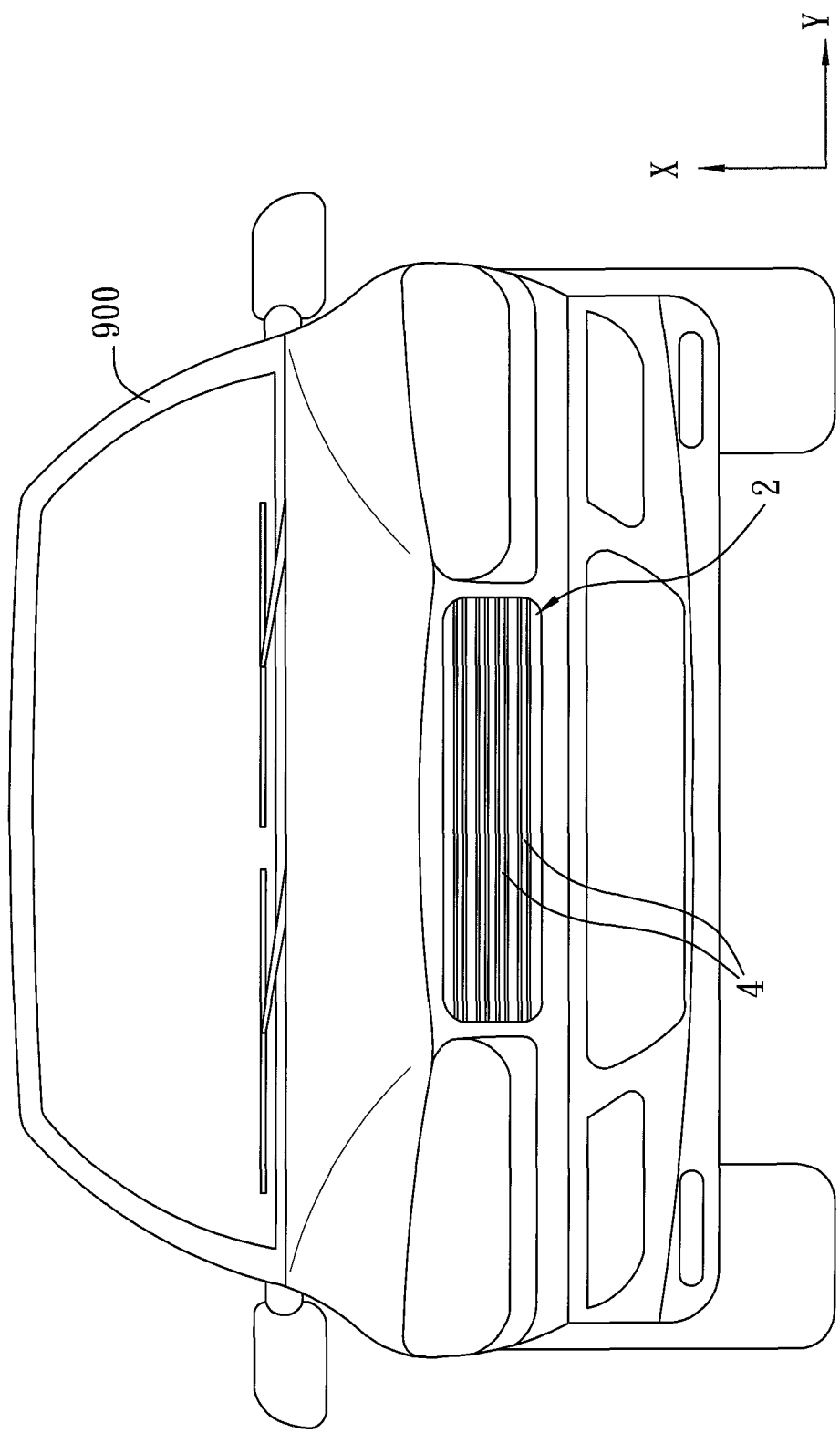
FIG. 8 is a schematic front view showing the third preferred embodiment of a luminous radiator cover device for a vehicle according to the present invention when mounted to the vehicle.
Figure 9:
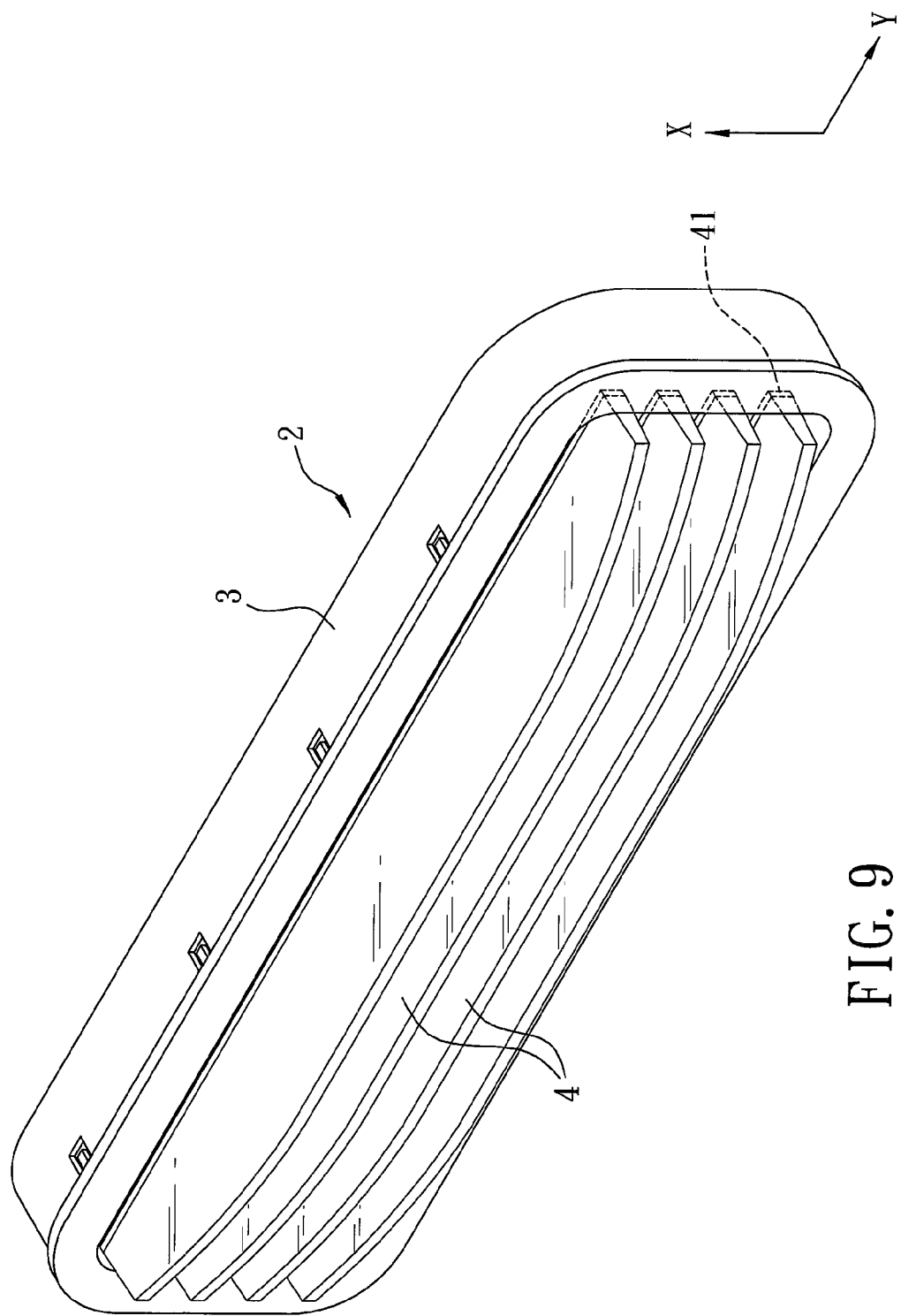
FIG. 9 is a perspective view showing a lighting cover unit of the third preferred embodiment.
Figure 10:
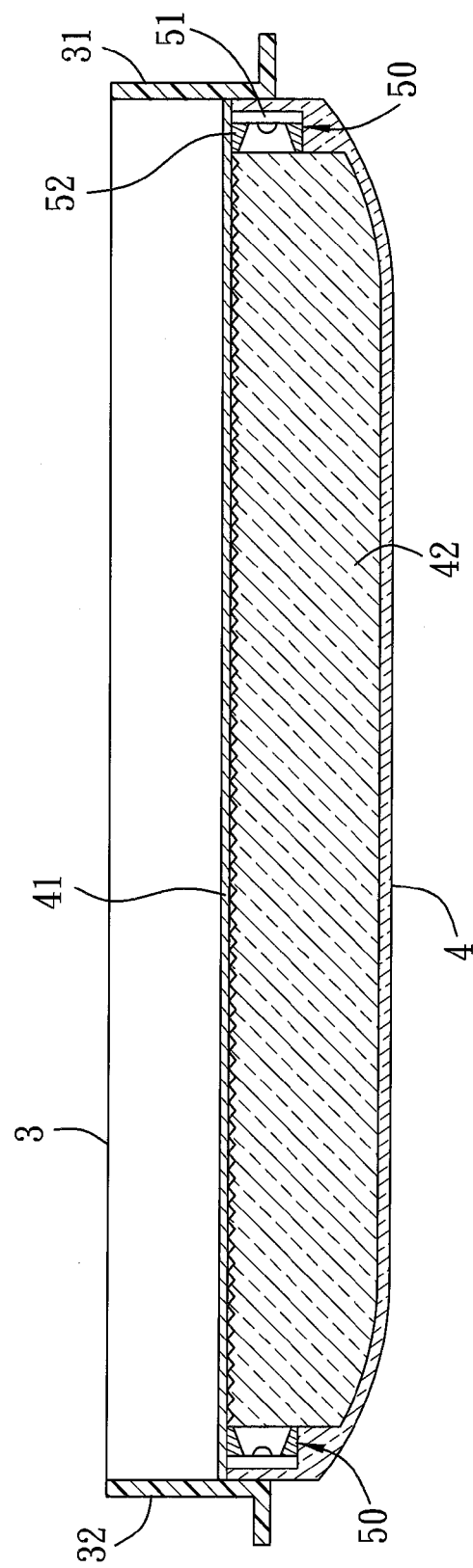
FIG. 10 is a schematic sectional view showing the lighting cover unit of the third preferred embodiment. Before the present invention is described in greater detail, it should be noted that like elements are denoted by the same reference numerals throughout the disclosure.

FIGS. 8 to 10 illustrate the third preferred embodiment of a luminous radiator cover device for a vehicle 900 according to this invention, which is a modification of the second preferred embodiment. In this embodiment, only a single lighting cover unit 2 is embodied. In addition, the first direction (X) is the vertical direction, and the second direction (Y) is the horizontal direction. Thus, the lighting modules 50 adjacent to a right side 31 of the looped frame 3 constitute a right group of the lighting modules 50, and the lighting modules 50 adjacent to a left side 32 of the looped frame 3 constitute a left group of the lighting modules 50. As a result, when the lighting units 5 operate in the second lighting mode, the lighting modules 50 of one of the right and left groups are controlled by the controller 64 (as shown in FIG. 4) to flash, and the lighting modules 50 of the other one of the right and left groups are controlled by the controller 64 to continuously emit light or cease light emission in accordance with the external directional signal received by the controller 64.

In summary, when the lighting units 5 operate in the first lighting mode, the luminous radiator cover device of this invention can achieve various lighting effects with combinations of various flash frequencies, various degrees of brightness and various colors. When the lighting units 5 operate in the second lighting mode, the luminous radiator cover device of this invention can provide direction indication for the vehicle 900. Therefore, the luminous radiator cover device of this invention has enhanced market competitiveness and commercial value. Furthermore, due to the presence of the light diffusion ribs 42, the luminous radiator cover device of this invention radiates gentle light compared to the prior art, thereby ensuring driving safety.

The invention claimed is:

1. A luminous radiator cover device for a vehicle, comprising:
    at least one lighting cover unit including a looped frame adapted to be mounted to a front side of the vehicle;
    a plurality of hollow light-transmissive ribs disposed spacedly in and connected to said looped frame, and arranged in a first direction, each of said light-transmissive ribs extending in a second direction transverse to the first direction and being configured with an inner receiving space that extends in the second direction;
    a plurality of lighting units each disposed in said inner receiving space of a corresponding one of said light-transmissive ribs and capable of emitting light;
    a control unit connected electrically to said lighting units of said lighting cover unit, said control unit being operable to control said lighting units of said lighting cover unit to operate in a first lighting mode, where lighting of each of said lighting units is varied in response to at least sound in the vehicle, and
    wherein said control unit includes:
        a sound collector for collecting the sound in the vehicle to output an audio signal corresponding to the sound collected thereby;
        an audio analyzer connected electrically to said sound collector, receiving the audio signal from said sound collector, analyzing the audio signal to obtain frequency variation of the audio signal, and outputting a frequency analysis signal corresponding to the frequency variation of the audio signal;
        a controller connected electrically to said audio analyzer and said lighting units of said lighting cover unit, and receiving the frequency analysis signal from said audio analyzer, said controller controlling said lighting units of said lighting cover unit based on at least the frequency analysis signal to operate in the first lighting mode such that the light emitted by each of said lighting units has a flash frequency varying with the frequency variation of the audio signal;
    a temperature sensor adapted to be disposed in the vehicle and connected electrically to said controller for sensing ambient temperature near said temperature sensor to output to said controller a temperature signal corresponding to the ambient temperature; and
    said controller further receives the temperature signal from said temperature sensor, and controls said lighting units of said lighting cover unit based on the frequency analysis signal and the temperature signal to operate in the first lighting mode such that the flash frequency of the light emitted by each of said lighting units varies with the frequency variation of the audio signal and such that the light emitted by each of said lighting units has a color varying with the ambient temperature.

2. The luminous radiator cover device as claimed in claim 1, wherein: said audio analyzer further analyzes the audio signal to obtain intensity variation of the audio signal, and further outputs to said controller an intensity analysis signal corresponding to the intensity variation of the audio signal; and the controller further receives the intensity analysis signal from said audio analyzer, and controls said lighting units of said lighting cover unit based on the frequency analysis signal and the intensity analysis signal to operate in the first lighting mode such that the flash frequency of the light emitted by each of said lighting units varies with the frequency variation of the audio signal and such that the light emitted by each of said lighting units has a brightness varying with the intensity variation of the audio signal.

3. The luminous radiator cover device as claimed in claim 1, wherein the first direction is a vertical direction, and the second direction is a horizontal direction.

4. The luminous radiator cover device as claimed in claim 1, wherein the first direction is a horizontal direction, and the second direction is a vertical direction.

5. A luminous radiator cover device for a vehicle, comprising:
    at least one lighting cover unit including a looped frame adapted to be mounted to a front side of the vehicle;
    a plurality of hollow light-transmissive ribs disposed spacedly in and connected to said looped frame, and arranged in a first direction, each of said light-transmissive ribs extending in a second direction transverse to the first direction and being configured with an inner receiving space that extends in the second direction;
    a plurality of lighting units each disposed in said inner receiving space of a corresponding one of said light-transmissive ribs and capable of emitting light; and
    a control unit connected electrically to said lighting units of said lighting cover unit, said control unit being operable to control said lighting units of said lighting cover unit to operate in a first lighting mode, where lighting of each of said lighting units is varied in response to at least sound in the vehicle, and wherein, upon receipt of an external directional signal for controlling directional indicators of the vehicle or for indicating change in a traveling direction of the vehicle, said control unit is operable to control said lighting units of said lighting cover unit to operate in a second lighting mode, where the lighting of each of said lighting units is varied in response to the external directional signal.

6. A luminous radiator cover device for a vehicle, comprising:
at least one lighting cover unit including a looped frame adapted to be mounted to a front side of the vehicle;
a plurality of hollow light-transmissive ribs disposed spacedly in and connected to said looped frame, and arranged in a first direction, each of said light-transmissive ribs extending in a second direction transverse to the first direction and being configured with an inner receiving space that extends in the second direction;
a plurality of lighting units each disposed in said inner receiving space of a corresponding one of said light-transmissive ribs and capable of emitting light;
a control unit connected electrically to said lighting units of said lighting cover unit, said control unit being operable to control said lighting units of said lighting cover unit to operate in a first lighting mode, where lighting of each of said lighting units is varied in response to at least sound in the vehicle; and
wherein:
each of said light-transmissive ribs of said lighting cover unit has a rear opening in spatial communication with said inner receiving space; and
said lighting cover unit further includes a plurality of cover plates each mounted to a corresponding one of said light-transmissive ribs for covering said rear opening of the corresponding one of said light-transmissive ribs, each of said cover plates having a front reflecting surface capable of reflecting light.

7. The luminous radiator cover device as claimed in claim 6, wherein each of said lighting units includes two lighting modules capable of emitting light and spaced apart from each other in the second direction.

8. The luminous radiator cover device as claimed in claim 7, wherein each of said lighting modules of each of said lighting units includes a light-mounting seat, a light-emitting element mounted on said light-mounting seat, connected electrically to said control unit and capable of emitting light, and a light-guiding seat attached to said light-mounting seat and disposed around said light-emitting element for guiding the light emitted by said light-emitting element toward the other one of said lighting modules.

9. The luminous radiator cover device as claimed in claim 8, wherein said light-emitting element of each of said lighting modules of each of said lighting units is a light emitting diode.

10. The luminous radiator cover device as claimed in claim 7, wherein said lighting cover unit further includes a plurality of light diffusion ribs, each of which is mounted fittingly in said inner receiving space of a corresponding one of said light-transmissive ribs and is disposed between said lighting modules that are disposed in said inner receiving space of the corresponding one of said light-transmissive ribs for diffusing the light emitted by said lighting modules.

11. The luminous radiator cover device as claimed in claim 10, wherein each of said light diffusion ribs has a rear side that faces said front reflecting surface of said cover plate mounted to the corresponding one of said light-transmissive ribs and that is formed with a plurality of protrusions, which extend in the first direction and are arranged spacedly in the second direction for scattering the light emitted by said lighting modules disposed in said inner receiving space of the corresponding one of said light-transmissive ribs and/or reflected by said front reflecting surface of said cover plate mounted to the corresponding one of said light-transmissive ribs.

* * * * *